US012613181B2

(12) United States Patent (10) Patent No.: US 12,613,181 B2

Mineta et al. (45) Date of Patent: Apr. 28, 2026

(54) CORROSION AMOUNT ESTIMATION DEVICE AND METHOD

(71) Applicant: NTT, Inc., Tokyo (JP)

(72) Inventors: Shingo Mineta, Musashino (JP); Shota Oki, Musashino (JP); Mamoru Mizunuma, Musashino (JP); Masayuki Tsuda, Musashino (JP)

(73) Assignee: NTT, Inc., Tokyo (JP)

( * ) Notice: Subject to any disclaimer, the term of this patent is extended or adjusted under 35 U.S.C. 154(b) by 1018 days.

(21) Appl. No.: 17/777,150

(22) PCT Filed: Nov. 22, 2019

(86) PCT No.: PCT/JP2019/045769

§ 371 (c)(1),
(2) Date: May 16, 2022

(87) PCT Pub. No.: WO2021/100193

PCT Pub. Date: May 27, 2021

(65) Prior Publication Data

US 2022/0404264 A1 Dec. 22, 2022

(51) Int. Cl.
G01N 17/00 (2006.01)
G01N 17/02 (2006.01)

(52) U.S. Cl.
CPC .................................. G01N 17/00 (2013.01)

(58) Field of Classification Search
CPC ....... G01N 17/00; G01N 17/006; G01N 17/02

(Continued)

(56) References Cited

U.S. PATENT DOCUMENTS 2,796,583 A * 6/1957 Marsh .................... G01N 17/02
324/439
4,800,165 A * 1/1989 Oka ........................ G01N 17/02
422/53

(Continued)

FOREIGN PATENT DOCUMENTS

JP H10-21211 A 1/1998
JP 2012-251846 A 12/2012
JP 2018-91740 A 6/2018

OTHER PUBLICATIONS

Hilbert, L. R., Corrosion Science 2006, 48, 3907-3923. (Year: 2006).*

(Continued)

*Primary Examiner* — Arlen Soderquist
(74) *Attorney, Agent, or Firm* — Workman Nydegger

(57) ABSTRACT

A corrosion rate estimation device for estimating a corrosion rate of a metal disposed in a predetermined environment includes an input unit that inputs water component information including information such as water content (time), temperature, conductivity, soil type, and the like, a corrosion rate estimation model configured to receive the water component information related to a water component contained in the predetermined environment as an input, and estimate the corrosion rate of the metal disposed in the predetermined environment from the water component information, and an output unit that outputs the estimated corrosion rate of the metal to the outside. The corrosion rate estimation model is generated using, for example, a machine learning algorithm such as a random forest, a neural network, or RNN (LSTM).

4 Claims, 6 Drawing Sheets

(58) Field of Classification Search
USPC ................................................ 422/53; 436/6
See application file for complete search history.

(56) References Cited

U.S. PATENT DOCUMENTS

| | | | | |
|---|---|---|---|---|
| 2002/0072878 | A1* | 6/2002 | Kanehira | G01N 17/00 |
| | | | | 702/183 |
| 2004/0176934 | A1* | 9/2004 | Kihira | G01N 17/006 |
| | | | | 324/700 |
| 2017/0030850 | A1* | 2/2017 | Castaneda-Lopez | |
| | | | | G01N 27/20 |
| 2017/0051215 | A1* | 2/2017 | Wang | G05B 23/0221 |
| 2021/0018425 | A1* | 1/2021 | Alanazi | G01N 17/006 |
| 2022/0163441 | A1* | 5/2022 | Fujimoto | G01N 33/2045 |
| 2022/0221387 | A1* | 7/2022 | Oki | G01N 33/24 |
| 2022/0221393 | A1* | 7/2022 | Mineta | G06N 7/00 |
| 2022/0390354 | A1* | 12/2022 | Oki | G01N 17/006 |
| 2022/0414486 | A1* | 12/2022 | Mineta | G06N 20/00 |

OTHER PUBLICATIONS

Song, F. M. et al, Corrosion Science 2008, 50, 70-83. (Year: 2008).*

Alamilla, J. L. et al, Corrosion Science 2009, 51, 2628-2638. (Year: 2009).*

Liu, Z. et al, Journal of computing in Civil Engineering 2010, 24, 289-301. (Year: 2010).*

Petersen, R. B. et al, Corrosion & Prevention 2012, Paper 023, 12 pages. (Year: 2012).*

Tahir, S. N. F. M. M. et al, Journal of Pressure Vessel Technology 2015, 137, Paper 051701, 6 pages. (Year: 2015).*

Chen, J. et al, Scientific Reports 2015, 5, Paper 14939, 11 pages. (Year: 2015).*

Chen, X. et al, Materials and Design 2016, 89, 196-204. (Year: 2016).*

Gadala, I. et al, Materials and Design 2016, 97, 287-299. (Year: 2016).*

Velazquez, J. C. et al, Engineering Failure Analysis 2017, 79, 216-231. (Year: 2017).*

Kalyani, D. S. et al., Environmental Earth Sciences 2017, 76, Paper 568, 13 pages. (Year: 2017).*

Tewari, S. et al, Transportation Research Board 97th Annual Meeting 2018, 18 pages. (Year: 2018).*

Azoor, R. M. et al, Corrosion 2018, 74, 1177-1191. (Year: 2018).*

Zhi, Y. et al, Metals 2019, 9, Paper 383, 16 pages. (Year: 2019).*

Rajani, B. et al, Urban Water 2001, 3, 151-164. (Year: 2001).*

Oguzie, B. B. et al, Materials Chemistry and Physics 2004, 84, 1-6. (Year: 2004).*

Noor, E. A. et al, Arabian Journal for Science and Engineering 2014, 39, 5421-5435. (Year: 2014).*

Dang, D. N. et al, Electrochimica Acta 2015, 176, 1410-1419. (Year: 2015).*

Wasim, M. et al, Environmental Chemistry Letters 2018, 16, 861-879. (Year: 2018).*

Melchers, R. E. et al, Corrosion Engineering, Science and Technology 2018, 53, 524-530. (Year: 2018).*

Fei Qin et al., *Effect of Soil Moisture Content on Corrosion Behavior of X70 Steel*, International Journal of Electrochemical Science, vol. 13, 2018, pp. 1603-1613.

* cited by examiner

Fig. 1

ELAPSED TIME

Fig. 5

START

LEARNING STEP                    S1

INPUT STEP                       S2

ESTIMATION STEP                  S3

END

CORROSION AMOUNT ESTIMATION DEVICE AND METHOD

TECHNICAL FIELD

The present invention relates to a corrosion rate estimation device that estimates a corrosion rate of a metal embedded in the ground, and a method thereof.

BACKGROUND ART

In the related art, a corrosion rate of a metal embedded in the ground is estimated by obtaining a resistance value corresponding to the reaction resistance of corrosion using an AC impedance method, and estimating the corrosion rate on the basis of the numerical value (NPL 1).

CITATION LIST

Non Patent Literature

NPL 1: Fei Qin et al., "Effect of soil moisture content on corrosion behavior of X70 steel", Int. J. Electrochem. Sci., 13 (2018) 1603 to 1613, doi: 10.20964/2018.02.32

SUMMARY OF THE INVENTION

Technical Problem

However, devices having an electrochemical measurement function by AC impedance method are usually expensive and large. Further, a voltage or current frequency sweep is necessary for the measurement, and the time required for a single measurement is long. Furthermore, since voltage is applied, even though it is minute, the surface state of an object to be measured can also be changed when continuous measurement is performed for a long period of time. Thus, unfortunately, the electrochemical measurement by the AC impedance method is not suitable for a case where there are many targets or points where the corrosion rate is desired to be measured, a case where the measurement period is long, or the like.

In light of this problem, an object of the present invention is to provide a corrosion rate estimation device capable of estimating a corrosion rate of a metal embedded in the ground without performing measurement based on an electrochemical method, and a method thereof.

Means for Solving the Problem

According to one aspect of the present invention, a corrosion rate estimation device for estimating a corrosion rate of a metal disposed in a predetermined environment is provided. The device includes a corrosion rate estimation model configured to receive water component information related to a water component contained in the predetermined environment as an input, and estimate the corrosion rate of the metal from the water component information.

Further, According to another aspect of the present invention, a corrosion rate estimation method performed by a corrosion rate estimation device is provided. The method includes estimating a corrosion rate by using a corrosion rate estimation model configured to receive water component information related to a water component contained in a predetermined environment as an input, and estimate a corrosion rate of a metal disposed in the predetermined environment from the water component information.

Effects of the Invention

According to the present invention, it is possible to provide a corrosion rate estimation device capable of estimating a corrosion rate of a metal embedded in the ground without performing measurements based on an electrochemical method.

BRIEF DESCRIPTION OF DRAWINGS

FIG. 1 is a diagram illustrating a functional configuration example of a corrosion rate estimation device according to a first embodiment of the present invention.

FIG. 5 is a diagram illustrating an operation flowchart of the corrosion rate estimation device illustrated in FIG. 4.

DESCRIPTION OF EMBODIMENTS

Figure 2:
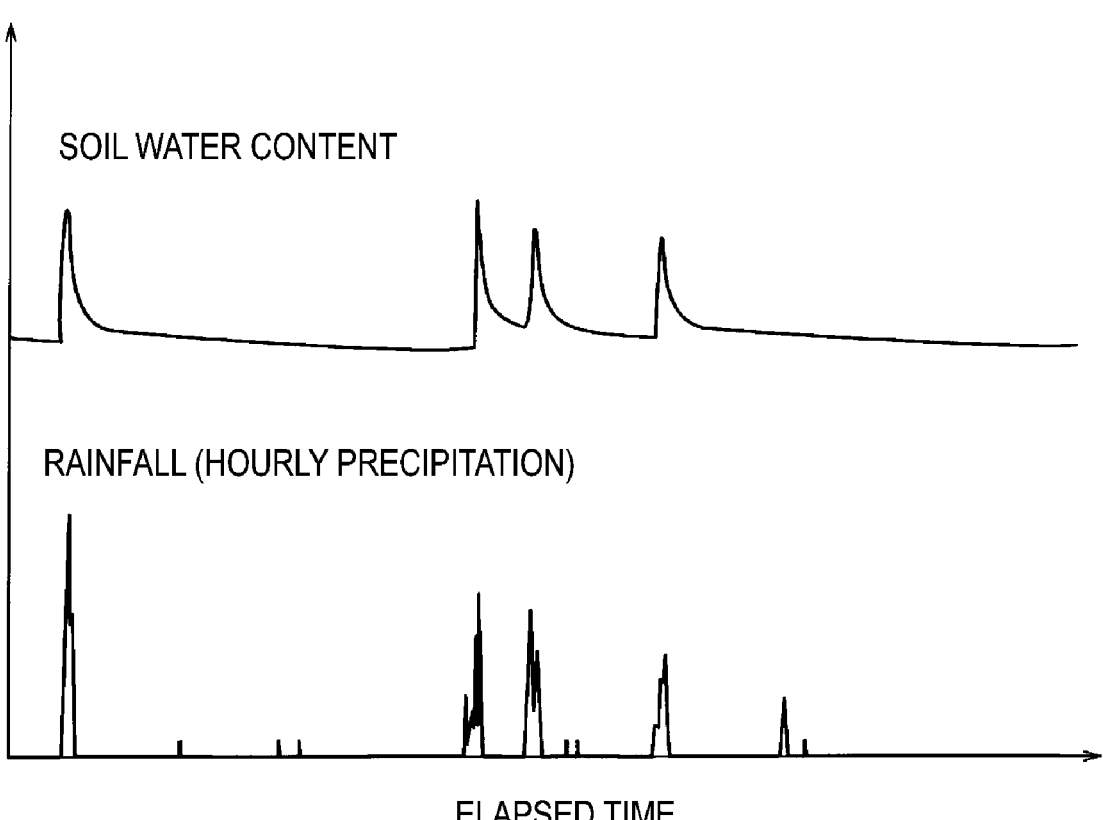
FIG. 2 is a diagram schematically illustrating a relationship between rain and a corrosion rate of metal in soil.

Hereinafter, embodiments of the present invention will be described with reference to the accompanying drawings. The same reference signs are given to the same constituent elements which are the same in the plurality of drawings, and description thereof is not repeated.

First Embodiment

Figure 1:
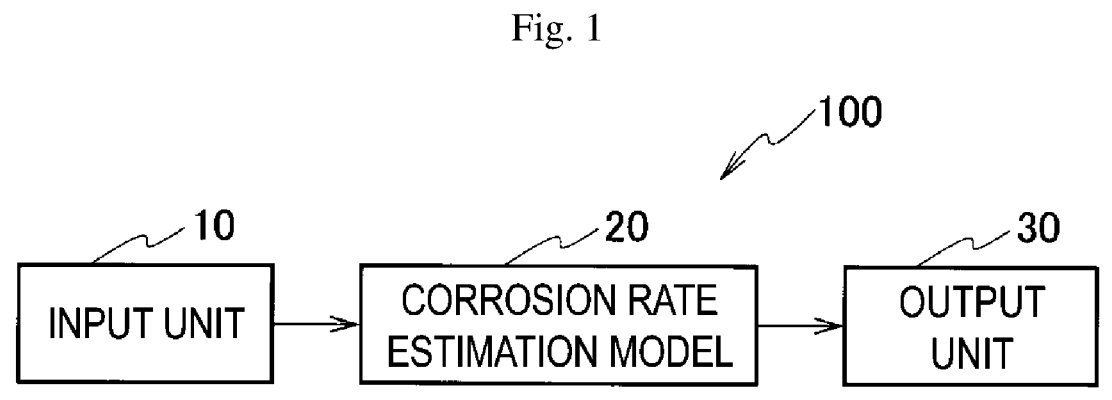

FIG. 1 is a block diagram illustrating a functional configuration example of a corrosion rate estimation device according to a first embodiment of the present invention. The corrosion rate estimation device 100 illustrated in FIG. 1 is a device for estimating a corrosion rate of a metal from water component information related to water components contained in an environment in which a target metal is disposed. The water component information is information such as water content (time), temperature, conductivity, and soil type.

The corrosion rate estimation device 100 includes an input unit 10, a corrosion rate estimation model 20, and an output unit 30. For example, the corrosion rate estimation device 100 can be implemented by a computer that includes a read only memory (ROM), a random access memory (RAM), a central processing unit (CPU), and the like.

The input unit 10 provides the water component information to the corrosion rate estimation model 20. The input unit 10 is, for example, an input port of a computer.

The corrosion rate estimation model 20 receives the water component information related to a water component contained in the environment as an input, and estimates the corrosion rate of the target metal from the water component information. The metal disposed in the environment changes in corrosion rate depending on the state of water that the metal contacts. By modeling the relationship between the state of water in the environment in which the target metal is disposed and the corrosion rate in advance, it is possible to estimate the corrosion rate without evaluating the corrosion rate using an AC impedance method or the like.

The output unit 30 outputs a corrosion rate estimated by the corrosion rate estimation model 20 to the outside. The output unit 30 is, for example, a computer display. Alternatively, the output unit 30 outputs information of the corrosion rate to another device such as a printer.

With the corrosion rate estimation device 100 according to the present embodiment described above, it is possible to estimate the corrosion rate of the metal embedded in the ground without performing measurements based on an electrochemical method. The corrosion rate estimation device 100 estimates the corrosion rate of the metal by wet corrosion.

The wet corrosion of metal will now be described. The wet corrosion is an electrochemical reaction in which a dissolution reaction (anode reaction) of metal and a reductive reaction (cathode reaction) of oxygen occur even if the environment in which the metal is disposed is any of the atmosphere, underwater, underground, and the like. Thus, the corrosion rate of the metal is largely related to the state of water and oxygen on a metal surface.

For example, water component information in water includes a type and concentration of chemical reactive species, conductivity, an amount of dissolved oxygen, a temperature of water, and the like. Depending on the state of these water components, the corrosion rate changes. The water component information in the atmosphere includes humidity, a film thickness of water on a metal surface, a wet area, conductivity, an amount of dissolved oxygen, a temperature of water, and the like. In addition, information related to wetness and dryness at time when the metal surface is wet with water and time when it is dry is also included in the water component information.

The water component information in soil also includes a water content. Hereinafter, a case of estimating the corrosion rate of a metal disposed in the soil (in the ground) will be described below.

The soil is a three-phase coexistence environment composed of earth particles including oxides such as Si, Al, Ti, Fe, Ca, and the like, and a gas phase (such as oxygen) and a liquid phase (such as water) present in gaps among soil particles. Given that a ratio of the gaps in the soil is constant, a sum of a ratio of the gas phase and a ratio of the liquid phase in the soil is constant, and if one is high, the other is low.

In the soil referred to as a neutral environment, a corrosion rate of metal varies primarily depending on the following elements. One is a state element such as a type and concentration of chemical reactive species contained in water, which is a liquid phase in the soil, conductivity, dissolved amount of oxygen, and temperature. Another is an element of the water content indicating the ratio of the liquid phase to the gas phase occupying a gap of the soil particles.

The state elements differ by the soil type, particle size distribution, depth, and the like, and are soil specific properties. On the other hand, the water content varies depending on natural environmental conditions such as, for example, rain.

FIG. 2 is a diagram schematically illustrating the relationship between rainfall and a soil water content. The horizontal axis in FIG. 2 is an elapsed time.

As illustrated in FIG. 2, an increase or decrease in the soil water content is in close communication with rainfall, rapidly increases during rain, and gradually decreases when rain stops. Thus, the water content varies rather than be constant, and the corrosion rate of the metal changes with the water content.

The relationship between environmental factor information in the ground, including a water content, and the corrosion rate of the metal is theoretically complex. However, by using appropriate information (data), the relationship between the environmental factor information and the corrosion rate can be modeled (corrosion rate estimation model 20).

Using the corrosion rate estimation model 20, it is possible to estimate the corrosion rate from the water component information including the water content. The corrosion rate estimation model 20 is generated using, for example, a machine learning algorithm.

Corrosion Rate Estimation Model

Figure 3:
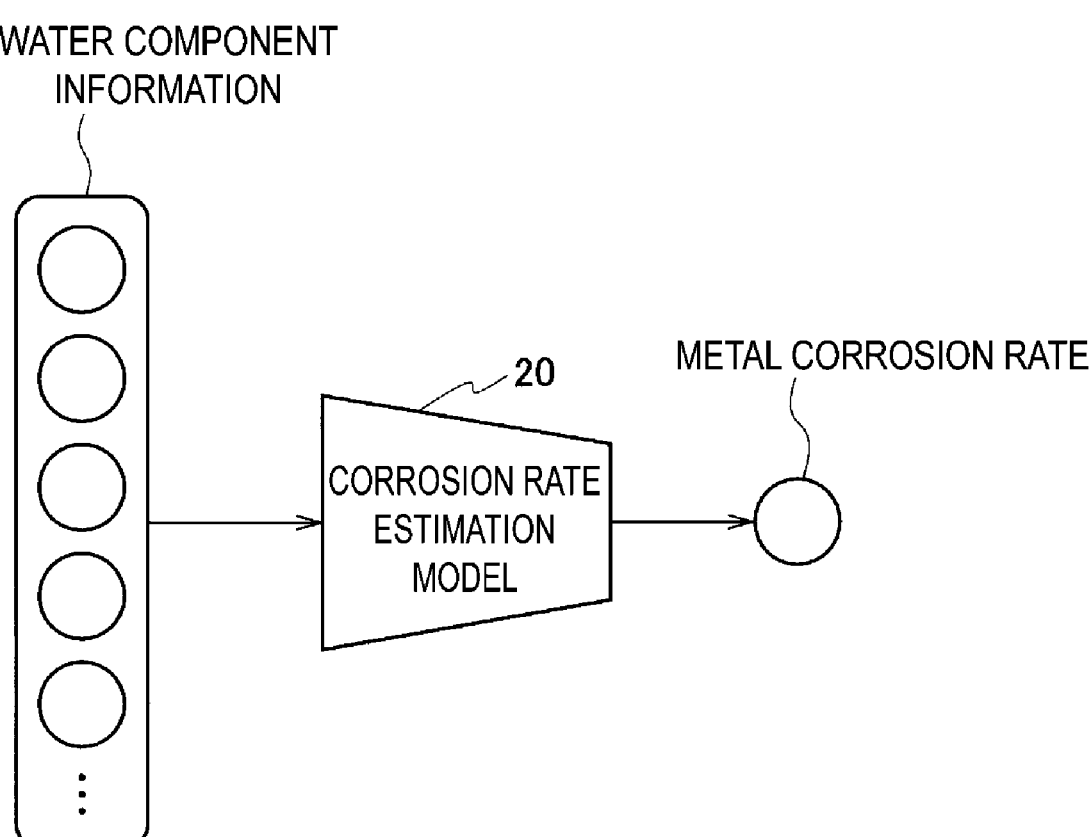
FIG. 3 is a diagram illustrating a conceptual drawing of a corrosion rate estimation model illustrated in FIG. 1.

FIG. 3 is a diagram illustrating a conceptual diagram of the corrosion rate estimation model 20. As illustrated in FIG. 3, the corrosion rate estimation model 20 is a model associating the water component information and the corrosion rate.

The corrosion rate estimation model 20 is generated using, for example, a machine learning algorithm such as a random forest, a neural network, or RNN (LSTM). Any algorithm may be used.

The corrosion rate estimation model 20 differs depending on the soil. Thus, water component information of various soil and information corresponding to the corrosion rate are measured and building of a model is performed by the machine learning algorithm, including information characterizing the soil. In this manner, for example, it is possible to generate the corrosion rate estimation model 20 that is appropriate by inputting the information characterizing the soil.

The corrosion rate estimation model 20 differs depending on the soil. Thus, information corresponding to the water component information and the corrosion rates of various soil is measured and building of the corrosion rate estimation model 20 is performed using the machine learning algorithm, including the information characterizing the soil. For example, it is possible to generate the corrosion rate estimation model 20 that is appropriate by inputting the information characterizing the soil.

Examples of the information characterizing the soil include classification information of soil group or soil series group of brown lowland soil or gleysol, andosol, and the like, information on soil texture classification determined from ratios of clay, silt, and sand based on a particle size of soil, depth where soil is present, presence or absence and type of microorganisms, and the like.

Thus, for example, the corrosion rate estimation model 20 can be generated by performing machine learning on the classification of the soil series group, the soil texture classification, the depth, the presence or absence of microorganisms, and the like as explanatory variables, together with information corresponding to the water component information and the corrosion rate.

By using the corrosion rate estimation model 20 thus generated, the corrosion rate of the metal can be estimated from the water component information of the environment in which the metal is placed.

Second Embodiment

Figure 4:
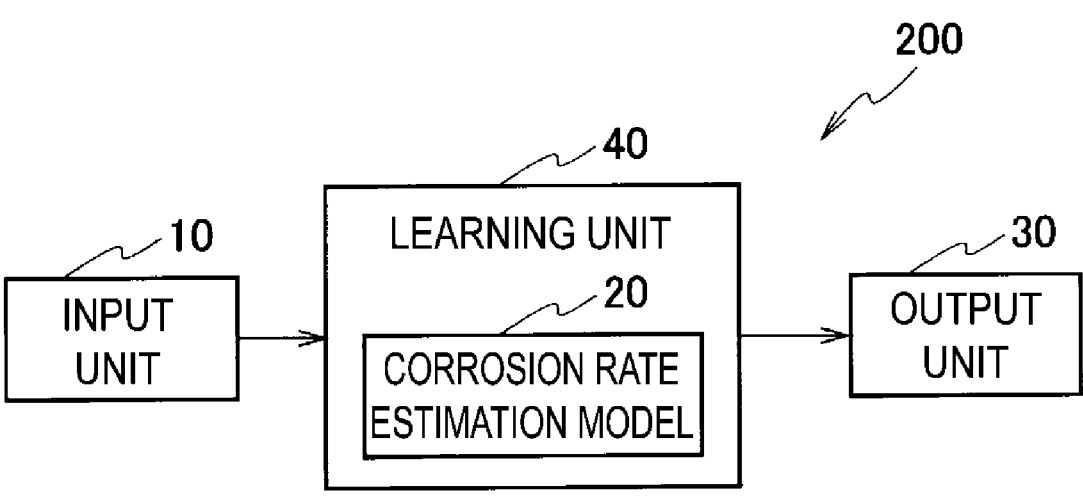
FIG. 4 is a diagram illustrating a functional configuration example of a corrosion rate estimation device according to a second embodiment of the present invention.

FIG. 4 is a diagram illustrating a functional configuration example of a corrosion rate estimation device according to a second embodiment of the present invention. The corrosion rate estimation device 200 illustrated in FIG. 4 differs from the corrosion rate estimation device 100 (FIG. 1) described above in that the corrosion rate estimation device 200 includes a learning unit 40.

The learning unit 40 trains a corrosion rate estimation model 20 that associates water component information with a corrosion rate. The learning unit 40 trains the corrosion rate estimation model 20 with the water component information being an explanatory variable that represents the state of the environment, and the corrosion rate as an objective function.

With the corrosion rate estimation device 200 according to the present embodiment, operation and effect are obtained in which the corrosion rate estimation model 20 can be updated at any time in accordance with the water component information input from the input unit 10 in the learning unit 40.

Corrosion Rate Estimation Method

Figure 5:
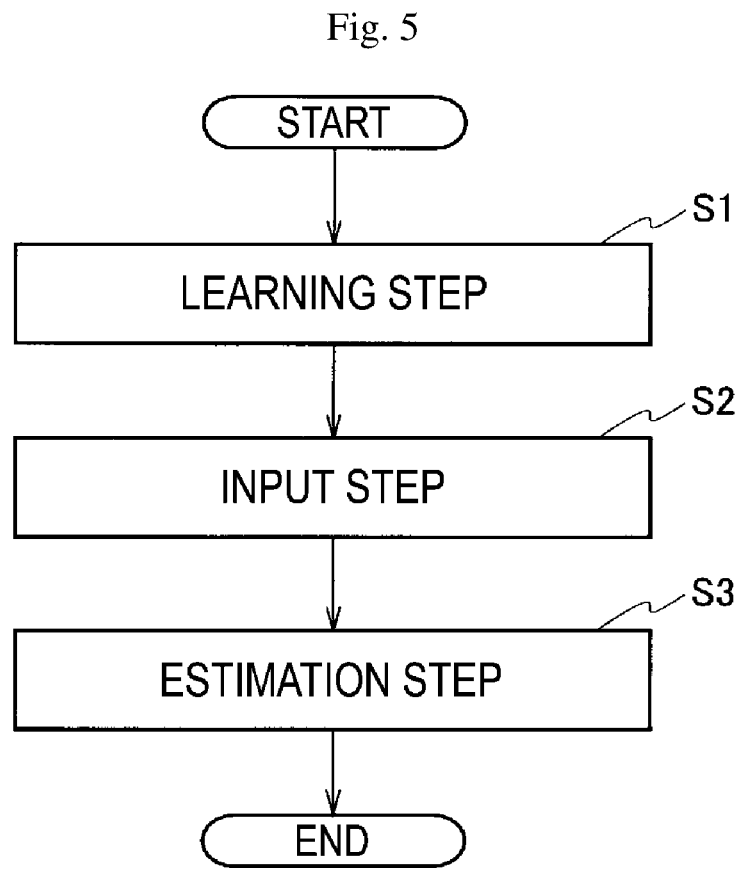

FIG. 5 illustrates an operation flowchart of the corrosion rate estimation device 200. As illustrated in FIG. 5, the operation flow chart of the corrosion rate estimation device 200 includes an input step S1, a learning step S2, and an estimation step S3.

The input step S1 inputs the water component information related to the water component included in a predetermined environment into the input port of the computer constituting the corrosion rate estimation device 200, for example. The predetermined environment is, for example, soil containing the target metal disposed, the corrosion rate of which is desired to be estimated.

The water component information includes, for example, information of a water content of the soil, chemical reactive species contained in water in the soil, concentration of the chemical reactive species, conductivity, solubility of oxygen, temperature, and the like.

The learning step S2 trains the corrosion rate estimation model 20 that represents the relationship between the water component information and the corrosion rate of the target metal. The training of the corrosion rate estimation model 20 is performed, for example, using the machine learning algorithm described above.

The estimation step S3 estimates the corrosion rate of the target metal from the water component information input in the input step S1 using the corrosion rate estimation model 20 trained in the learning step S2.

According to the corrosion rate estimation method performed by the corrosion rate estimation device 200, it is possible to estimate the corrosion rate of metal embedded in the ground without performing measurements based on an electrochemical method. Note that if the corrosion rate estimation model 20 is generated in advance, it is not necessary to perform the learning step S2.

In other words, if a corrosion rate estimation model 20 prepared in advance is used, it is sufficient to execute the estimation step S3 (corrosion rate estimation step) of estimating the corrosion rate by using a corrosion rate estimation model configured to receive water component information related to a water component contained in a predetermined environment as an input, and estimate a corrosion rate of a metal disposed in the environment from the water component information.

Specific Examples of Corrosion Rate Estimation Device

Figure 6:
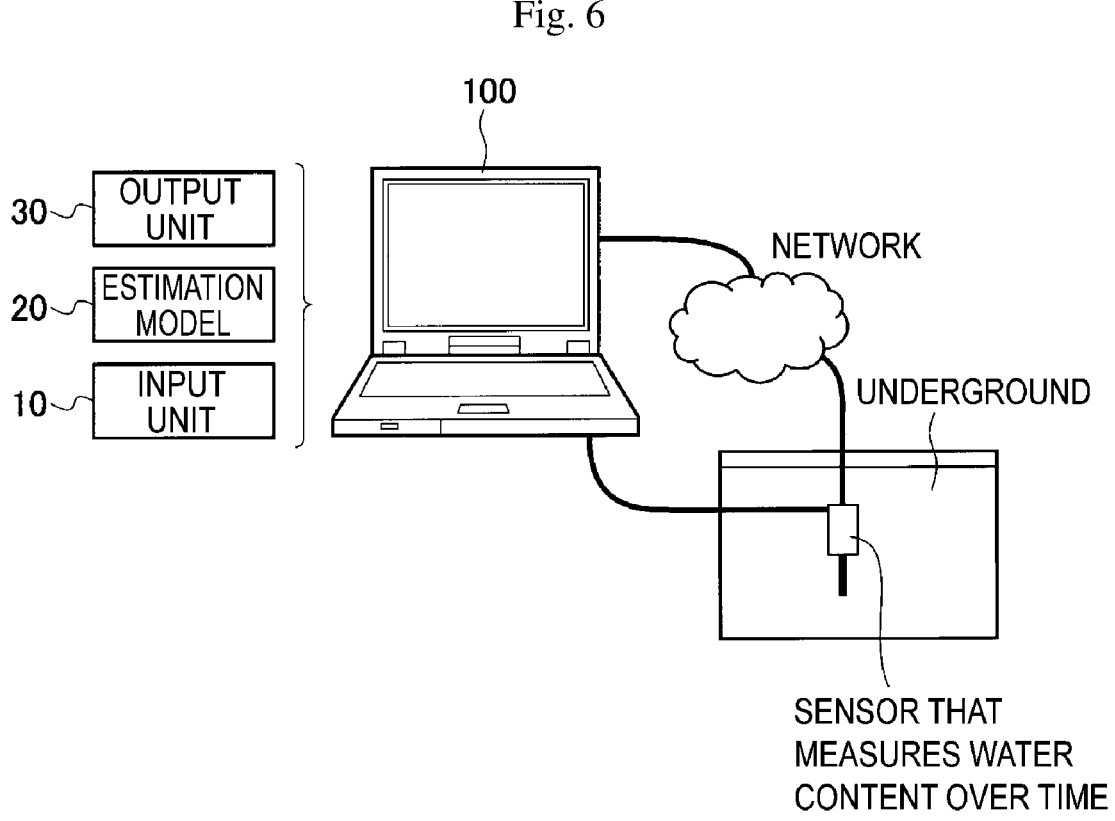
FIG. 6 is a diagram schematically illustrating a specific example of the corrosion rate estimation device illustrated in FIG. 1.

FIG. 6 is a diagram schematically illustrating a case in which the corrosion rate estimation device 100 is configured by a computer. As illustrated in FIG. 6, the corrosion rate estimation device 100 may include a single computer. The single computer includes an input unit 10, a corrosion rate estimation model 20, and an output unit 30.

The water component information is detected by a sensor embedded in the ground and input to the input unit 10. Based on successively input water component information, the corrosion rate estimation model 20 estimates the corrosion rate of the metal.

As illustrated in FIG. 6, a sensor that measures information related to the state of water can be used. For example, if the information is a water content, a measured value of the water content may be input as is. Further, for example, electrical resistance and electrical capacitance may be measured and converted to a water content. When oxygen concentration is input, a sensor for measuring the oxygen concentration is connected. The input unit 10 may include a plurality of sensors. These sensors and corrosion rate estimation devices 100 may be connected via a network.

As described above, the corrosion rate estimation devices 100 and 200 according to the present embodiments are devices that estimate the corrosion rate of metal by wet corrosion. The corrosion rate estimation devices 100 and 200 enable information corresponding to the corrosion rate to be estimated by modeling in advance the relationship between information related to the state of water in the environment in which the target metal is present and information corresponding to the corrosion rate of the target metal is modeled in advance by a statistical method and the machine learning algorithm, and giving the model the information related to the state of water in the environment in which the target metal is present.

That is, it is possible to estimate the corrosion rate of metal embedded in the ground without performing a measurement based on an electrochemical method. Note that the environment has been described by taking soil as an example in the above description of the embodiments, but the present invention is not limited to this example.

The environment may be in the atmosphere and in water. From the water component information of this environment, the corrosion rate of the metal disposed in the environment can be estimated.

The present invention is not limited to the embodiments described above, and modifications can be made within the scope thereof. For example, a water content of the soil, chemical reactive species contained in water in the soil, concentration of the chemical reactive species, conductivity, solubility of oxygen, temperature, and the like are mentioned as examples of the water component information, but the water component information may be other factors.

It is a matter of course that various embodiments and the like that are not described herein are also included in the present invention. Thus, the technical scope of the present invention is defined only invention-specific matters according to the claims that are appropriate based on the description above.

REFERENCE SIGNS LIST

10: Input unit
20: Corrosion rate estimation model
30: Output unit
40: Learning unit
100, 200: Corrosion rate estimation device

The invention claimed is:

1. A corrosion rate estimation device for estimating a corrosion rate of a metal disposed in a predetermined environment, the device comprising:

an input unit configured to acquire water component information from sensors embedded in the ground, the water component information including time-varying soil water content, temperature, soil pore-water conductivity, and dissolved oxygen, and soil-specific information including soil classification, soil texture, and depth;

a learning unit configured to continuously train and update a machine-learning corrosion rate estimation model that differs by soil type, wherein the machine-learning corrosion rate estimation model is trained using both the water component information and the soil-specific information; and the corrosion rate estimation model configured to estimate the corrosion rate of a metal in a predetermined environment from the water component information and the soil-specific information without using electrochemical measurements of the metal.

2. The corrosion rate estimation device according to claim 1, wherein the water component information includes a water content that represents an amount of water formerly contained in the predetermined environment.

3. A corrosion rate estimation method performed by a corrosion rate estimation device, the method comprising:

acquiring water component information from sensors embedded in the ground, the water component information including time-varying soil water content, temperature, soil pore-water conductivity, and dissolved oxygen, and soil-specific information including soil classification, soil texture, and depth;

continuously training and updating a machine-learning corrosion rate estimation model that differs by soil type, wherein the machine-learning corrosion rate estimation model is trained using both the water component information and the soil-specific information; and estimating a corrosion rate of a metal disposed in a predetermined environment from the water component information and the soil-specific information without using electrochemical measurements of the metal.

4. The corrosion rate estimation method according to claim 3, wherein the water component information includes a water content that represents an amount of water formerly contained in the predetermined environment.

* * * * *